United States Patent [19]

Mumcu et al.

[11] Patent Number: 5,580,913
[45] Date of Patent: Dec. 3, 1996

[54] PROCESS FOR INCORPORATING STABILIZER INTO POLYCONDENSATES

[75] Inventors: Salih Mumcu; Hasso Daebel, both of Marl, Germany

[73] Assignee: Huels Aktiengesellschaft, Marl, Germany

[21] Appl. No.: 366,019

[22] Filed: Dec. 29, 1994

Related U.S. Application Data

[63] Continuation of Ser. No. 139,167, Oct. 21, 1993, abandoned.

[30]    Foreign Application Priority Data

Jan. 23, 1993 [DE] Germany ............................ 43 01 808.4

[51] Int. Cl.$^6$ ....................................................... C08K 5/00
[52] U.S. Cl. ........................ 524/151; 523/220; 523/351; 524/91; 524/101; 524/126; 524/153; 524/219; 524/255; 524/257; 524/351
[58] Field of Search ...................... 524/151, 153, 524/605, 606, 291, 91, 255, 257, 351, 126, 101, 219; 528/308.5, 309.1; 523/220, 351

[56]    References Cited

U.S. PATENT DOCUMENTS

| | | | |
|---|---|---|---|
| 3,404,121 | 10/1968 | Barkey | 524/151 |
| 3,640,761 | 2/1972 | Hamanaka et al. | 524/352 |
| 3,761,450 | 9/1973 | Herwig et al. | 528/307 |
| 3,940,367 | 2/1976 | Pelonsek et al. | 524/141 |
| 3,956,214 | 5/1976 | Tate et al. | 523/324 |
| 4,101,526 | 7/1978 | Buxbaum | 528/179 |
| 4,399,265 | 8/1983 | Garware et al. | 528/308.2 |
| 4,520,148 | 5/1985 | Golder | 524/605 |
| 4,699,942 | 10/1987 | Weaver et al. | 524/605 |
| 4,755,587 | 7/1988 | Rinehart | 528/308.2 |
| 5,026,818 | 6/1991 | Heinz et al. | 528/318 |

FOREIGN PATENT DOCUMENTS

| | | |
|---|---|---|
| 2260213 | 6/1973 | Germany . |
| 2630087 | 1/1978 | Germany . |
| 932516 | 7/1963 | United Kingdom . |
| 1101325 | 1/1968 | United Kingdom . |
| 1480125 | 7/1977 | United Kingdom . |

*Primary Examiner*—Veronica P. Hoke
*Attorney, Agent, or Firm*—Oblon, Spivak, McClelland, Maier & Neustadt, P.C.

[57]    ABSTRACT

A process for the homogeneous incorporation of a stabilizers into a polycondensate in which the stabilizer is first applied to a finely divided solid polycondensate and the mixture is then revolved in the solid phase of the polycondensate, at temperatures of at least 80° C.

Products having an improved color and stability are obtained by this mild incorporation of stabilizer.

22 Claims, No Drawings

PROCESS FOR INCORPORATING STABILIZER INTO POLYCONDENSATES

This application is a Continuation of application Ser. No. 08/139,167, filed on Oct. 21, 1993, now abandoned.

This Application claims the benefit of priority under 35 U.S.C. 119 to DE P 43 01 808.4, the entire contents of which are hereby incorporated by reference.

BACKGROUND OF THE INVENTION

1. Field of the Invention

The invention relates to a process for the homogeneous incorporation of a stabilizer into a finely divided solid polycondensate.

2. Discussion of the Background

Polycondensates are widely employed for many purposes. During processing and use, they are exposed to the effects of air and light. This causes them to discolor, while their mechanical properties simultaneously deteriorate. This effect occurs all the more, the higher the temperature. To avoid the deficiencies above-mentioned, the polycondensates must be stabilized.

The most usual stabilizer incorporation process starts from a polymer granule/stabilizer mixture. This is melted and homogenized in a kneader or extruder. The melt is then forced through a perforated plate, and the strands are cooled in water and granulated. However, the process is expensive since it requires special kneaders and extruders with corresponding metering devices, and in general takes two granulating and two drying steps in going from the monomer to the stabilized polymer product.

It is also known to add stabilizers to the monomers in the reactor and to carry out the polycondensation in their presence. The disadvantage here is that the heat-sensitive stabilizers decompose during a long residence time and at a high temperature. The stabilizers sometimes can also react with the polymer, some of the stabilizer molecule becoming bonded to the polymer chain. The activity of the stabilizers is partially lost in this way.

DE-A 21 53 249 describes that improved polyamides are obtained by shortening the residence time of the stabilizer under heat. In this procedure, stabilizers are stirred into the polyamide melt at temperatures below 270° C. after the polycondensation. However, this discontinuous process cannot be satisfactory on a production scale since in the temperature range from 220° to 270° C., in which the polyamide melts are stirrable, the stabilizers undergo decomposition, transamidation and transesterification reactions during the 5- to 8-hour melt discharge phase, leading to significant losses in quality with respects of homogeneity, color and stability to ageing.

Another form of incorporation in the presence of a polyalkenamer is described in DE-A 36 13 528 (U.S. Pat. No. 4,840,993). In this case, liquid auxiliaries and additives are incorporated at a temperature of not more than 70° C. However, the process described cannot be applied to polyalkenamer-free polymers.

The object of the present invention is to provide a diverse incorporation process without using a kneader or extruder, by which homogeneous distribution of the stabilizer in the polymer is achieved under mild conditions.

SUMMARY OF THE INVENTION

This object has been achieved according to the invention by applying stabilizers to a finely divided solid polycondensate and then revolving the mixture in the solid phase of the polycondensate at a temperature of at least 80° C.

DETAILED DESCRIPTION OF THE PREFERRED EMBODIMENTS

Suitable stabilizers are, in particular, organic antioxidants and UV absorbers which are a solid at room temperature.

The antioxidants mainly belong to the group of sterically hindered phenols or sterically hindered amines. Examples of suitable antioxidants are:

2,6-di-tert-butyl-4-methylphenol,
octadecyl 3-(3,5-di-tert-butyl-4-hydroxyphenyl)propionate,
4,4'-butylidene-bis-(3-methyl-6-tert-butylphenol),
N,N'-hexamethylene-bis-(3,5-di-tert-butyl-4-hydroxyhydrocinnamide),
pentaerythritol tetrakis-[3-(3,5-di-tert-butyl-4-hydroxyphenyl)-propionate],
2,4-di-n-octylthio-6-(4-hydroxy-3,5-di-tert-butylamino)-1,3,5-triazine,
tris-(2,4-di-tert-butyl-phenyl) phosphite,
methyl β-(4-hydroxy-3,5-di-tert-butyl-phenyl)propionate,
2,2'-methylene-bis-(4-methyl-6-tert-butylphenol),
1,3,5-tris-(4-tert-butyl-3-hydroxy-2,6-dimethylbenzyl)-1,3,5-triazine-2,4,6(1H,3H,5H)trione,
4,4'-bis-(α,α-dimethylbenzyl)-diphenylamine,
N-(1,3-dimethylbutyl)-N'-phenyl-p-phenylene-diamine,
1,3,5-trimethyl-2,4,6-tris-(3,5-di-tert-butyl-4-hydroxybenzyl)-benzene,
[1,1'-biphenyl]-4,4'-diylbisphosphonous acid tetrakis[2,4-bis(1,1-dimethylethyl)phenyl]ester,
3,9-bis(octadecyloxy)-2,4,8,10-tetraoxa-3,9-diphosphaspiro[5.5]undecane,
preferably
pentaerythritol tetrakis-[3-(3,5-di-tert-butyl4-hydroxyphenyl)-propionate],
or
N,N'-hexamethylene-bis-(3,5-di-tert-butyl-4-hydroxyhydrocinnamide).

Among the UV absorbers, derivatives of benzotriazole are particularly suitable. Examples of suitable UV absorbers are:

2-(2-hydroxy-3,5-di-tert-butylphenyl)-benzotriazole,
2-(2-hydroxy-3,5-di-tert-amylphenyl)-benzotriazole,
2-(2-hydroxy-5-methylphenyl)-benzotriazole,
bis-[4-(2,2,6,6-tetramethylpiperidyl)]sebacate,
preferably
2-(2-hydroxy-3,5-di-tert-butylphenyl)-benzotriazole
or
2-(2-hydroxy-3,5-di-tert-amylphenyl)-benzotriazole.

It is not necessary to limit the concentration in the context of the present invention. However, the usual stabilizer concentrations are established. They are preferably less than 2 percent by weight, in particular between 0.1 and 1.0 percent by weight—based on the weight of the polycondensate.

The stabilizers preferably melt in the range from 100° to 200° C. They can be employed individually or as a mixture.

Possible polycondensates are primarily homo- and copolyamides, polyether-ester-amides, polyether-amides and polyether-esters.

Homopolyamides which can be employed are, for example, polyamide 6, polyamide 66, polyamide 69, polyamide 612, polyamide 1012, polyamide 1212, polyamide 11, polyamide 12 and polyamides of terephthalic acid and trimethylhexamethylenediamine. The process according to the invention is preferably suitable for polyamide 6, polyamide 612, polyamide 1012, polyamide 11 and polyamide 12.

The identification of the polyamides (PA) corresponds to the international standard (H. Domininghaus, Die Kunststoffe und ihre Eigenschaften [Plastics and their Properties], VDI-Verlag, page 272, (1976)).

The homopolyamides mentioned are not critical in the context of the invention and are well known to those of skill in the art. The synthesis of homopolyamides is described, for example, in Kunststoff-Handbuch [Plastics Handbook], Volume VI, C.-Hanser-Verlag (1966), DE-C 21 52 194 and DE-A 25 03 308. They can be crystalline or amorphous. They have the following preferred ranges:

| TYPE | Viscosity No. |
| --- | --- |
| PA 6 | 150–400 |
| PA 11 | 100–360 |
| PA 12 | 100–360 |
| PA 612 | 120–260 |

Viscosity number is determined in accordance with DIN 53 727. The polyamides mentioned are employed individually or as a mixture.

Suitable copolyamides are mainly those which contain base monomers which lead to the abovementioned homopolyamides. Possible co-components are, for example, lauryllactam, 11-aminoundecanoic acid, caprolactam, adipic acid/hexamethylenediamine, dodecanedioic acid/hexamethylenediamine, dodecanedioic acid/methylpentanediamine, dodecanedioic acid/decamethylenediamine and dodecanedioic acid/isophoronediamine. It should be remembered, however, that the comonomer content chosen is only so high that the crystalline melting point of the copolymer is not below 100° C. (by DSC determination).

Preferred copolyamides comprise lauryllactam/caprolactam, lauryllactam/caprolactam/adipic acid+hexamethylenediamine, lauryllactam/dodecanedioic acid+decamethylenediamine and lauryllactam/caprolactam/11-aminoundecanoic acid having a crystalline melting point in the range from 100° to 190° C.

The synthesis of such copolyamides is described, for example, in DE-A 39 21 164, 23 24 160, 19 39 758 and 32 48 776.

The copolyamides mentioned are employed individually or as a mixture.

Polyether-ester-amides or polyether-amides are likewise suitable for the process according to the invention. Preferred polymers of this type are built up from PA-12 and polyoxytetramethylene blocks. They are known from the publications DE-A 27 12 987 (U.S. Pat. No. 4,207,410), DE-A 25 23 991, EP-B 0 471 960 and DE-A 34 28 404.

In general, they have viscosity numbers of 140 to 360 as determined in accordance with DIN 53 727.

Among the polyether-esters, block copolyesters can be used in particular for the process according to the invention. Such products are described, for example, in Chimia 28 (9), pages 544 to 55, (1974), and in Rubber Chemistry and Technology 50, pages 688 to 703, (1977). In addition to aromatic dicarboxylic acids and aliphatic or cycloaliphatic diols, these block copolyesters comprise a poly(oxyalkylene)diol having a molecular weight (Mn) in the range from 450 to 4,000, preferably 600–2,500. Preferred poly(oxyalkylene)diols are poly(oxyethylene)diol, poly(oxypropylene)diol and poly(oxytetramethylene)diol. Block copolyesters having poly (oxytetramethylene) diol contents of between 4 and 60% by weight, preferably 10–50% by weight (based on the copolyester) are particularly suitable for the process according to the invention.

The suitable polyether-esters usually have a viscosity number in the range from 140 to 360 as determined in accordance with DIN 53 727 in a mixture of phenol and 1,2-dichlorobenzene (50/50 by volume).

The polyether-esters mentioned are employed individually or as a mixture.

Incorporation of the stabilizers by revolving is preferably carried out at temperatures at least 10° C. below the polymer melting point (by DSC) if the polymer is crystalline. If the polymer is amorphous, the upper temperature limit is preferably 10° C. below the glass transition point of the amorphous polymer. A temperature range from 90° to 180° C. is especially preferably established.

For incorporation of the stabilizers, the polymer is introduced in finely divided solid form into a container. The polymers are finely divided in the context of the present invention if the particle sizes are in the range from 0.5 to 10 mm. Particle sizes of 1 to 6 mm, more preferably 1,5–3 mm are preferred here.

Tumble driers, paddle driers and fluidized bed driers have proved to be suitable containers. The incorporation is preferably carried out in a tumble drier or paddle drier. When carrying out the process in practice, the granules and stabilizer are preferably first mixed homogeneously. The mixture is then heated to the abovementioned temperatures according to the invention and is revolved until the stabilizer has diffused into the particles. The incorporation time is as a rule between 30 minutes and 8 hours. The process is preferably carried out under an inert gas atmosphere (for example $N_2$ or Ar).

There are no objections in principle to mixing the stabilizer with granules which have already been heated. It is also possible for the incorporation to be carried out not separately but during an after-treatment of the polymer which is otherwise also necessary (for example drying, solid phase post-condensation or the like). The jacket temperature of the drier should be chosen at not more than 10° C. below the melting point of the polymer to avoid caking. In general, the stabilizer is in powder form at room temperature and liquid at the incorporation temperature. If certain polymers are used, such as polyether-ester-amides, polyether-amides and polyetheresters, the incorporation can take place at temperatures at which the stabilizer does not yet melt.

No kneaders or extruders are required for the incorporation process according to the invention. The process allows economic and gentle incorporation leading to a homogeneous distribution of the stabilizer in the polymer. The color and stability of the polycondensates to ageing are improved.

Other features of the invention will become apparent in the course of the following descriptions of exemplary embodiments which are given for illustration of the invention and are not intended to be limiting thereof.

In the following text, examples according to the invention are identified by numbers and examples which are not according to the invention are identified by letters.
Determination Methods Viscosity number in accordance with DIN 53 727

Melting point determination by DSC in accordance with ASTM D 3418-82

$NH_2$ end group determination: the polyamide is dissolved in m-cresol and titrated with $HClO_4$ solution COOH end group determination: the polyamide is dissolved in benzyl alcohol and titrated with KOH solution Water content determination in accordance with ASTM D 4019

Shore hardness determination in accordance with DIN 53 505

HPLC analysis using an apparatus from Hewlett Packard (type 1090 L) with a ternary pump system PV 5, filter photometer detector (wavelength 269 nm) and column: Li-Chrospher 100 RP-8 (5 μm).

EXAMPLE 1

7 t (metric tons) of PA-612 granules (viscosity number: 120; end group concentration: 140 meq. of —COOH/kg and 8 meq. of —NH$_2$/kg; T$_m$ by DSC: 216° C.) and 35 kg of N,N'-hexamethylene-bis-(3,5-di-tert-butyl-4-hydroxy-hydrocinnamide) (stabilizer 1) having a melting range of 156° to 161° C. were homogenized in a 20 m$^3$ tumble drier at a speed of rotation of 10 rpm in the course of 2 hours. The air is then displaced by nitrogen. The drier is subsequently heated to 180° C. while passing in nitrogen (20 m$^3$/h). When the granule temperature has reached 170° C., the entire amount of stabilizer has already been absorbed by the granules. Finally, the contents of the drier are cooled. Colorless granules having a viscosity number of 122 are obtained. HPLC analysis shows a content of 0.5% by weight of stabilizer 1, which corresponds to the theoretical value.

EXAMPLE A (According to DE-A 21 53 249, for Comparison with Example 1)

7 kg of colorless polyamide 612 melt having the following analytical values are prepared in a 20 l tank with a helical stirrer starting from hexamethylenediamine and dodecanedioic acid:

Viscosity number: 116

(—COOH):148 meq./kg (—NH2):5 meq./kg

Water content:0.20% by weight 35 g of N,N'-hexamethylene-bis-(3,5-di-tert-butyl-4-hydroxy-hydrocinnamide) (stabilizer 1) are stirred into this PA-612 melt, which is cooled to 250° C., at 40 rpm under a blanket of N$_2$ in the course of one hour. The melt is then discharged and granulated, only about 1 kg of melt being discharged per hour to simulate a production batch. The analytical values shown in Table 1 are determined on resulting granule samples:

TABLE 1

| Time (h) | Viscosity No. | Color | Stabilizer 1 content according to HPLC analysis (% by wt.)* | Decomposed stabilizer 1 content (% by wt.)** |
| --- | --- | --- | --- | --- |
| Start 0 | 114 | slight yellowish tinge | 0.42 | 16 |
| 1 | 114 | slight yellowish tinge | 0.40 | 20 |
| 2 | 112 | slight yellowish tinge | 0.38 | 24 |
| 3 | 112 | slight yellowish tinge | 0.35 | 30 |
| 4 | 110 | slight yellowish tinge | 0.32 | 36 |
| 5 | 108 | slight yellowish tinge | 0.29 | 42 |
| 6 | 104 | slight yellowish tinge | 0.26 | 48 |

*Concentration in the granules
**Based on the starting amount of stabilizer

The table shows that the stabilizer decomposes in the reactor and reacts with the polymer. An inhomogeneous polycondensate which is not perfect in color and in which each granule does not have the same stabilizer content is obtained.

EXAMPLE 2

7 t (metric tons) of PA-12 granules (viscosity number: 176; end group concentration: 56 meq. of COOH/kg and 9 meq. of NH$_2$/kg; T$_m$ by DSC: 179° C.; water content: 0.25% by weight), 35 kg of N,N'-hexamethylene-bis-(3,5-di-tert-butyl-4-hydroxy-hydrocinnamide) (stabilizer 1) having a melting range of 156° to 161° C. and 35 kg of 2-(2-hydroxy-3,5-di-tert-butylphenyl)-benzotriazole (stabilizer 2) having a melting point of 154° C. are homogenized in a 20 m$^3$ tumble drier at a speed of rotation of 10 rpm in the course of 2 hours. After the air has been excluded, the mixture is heated at a jacket temperature of 170° C. while passing in nitrogen (20 m$^3$/h). When the granule temperature has reached 163° C., the entire amount of stabilizer has been absorbed by the granules. Finally, the contents of the drier are cooled. Colorless granules having a viscosity number of 180 and a water content of 0.03 percent by weight are obtained. HPLC analysis shows stabilizer contents which correspond to the theoretical values: 0.5 percent by weight of stabilizer 1 and 0.5 percent by weight of stabilizer 2.

EXAMPLE 3

7 t (metric tons) of polyether-ester-amide granules (Shore D hardness: 40; viscosity number: 200; T$_m$ by DSC: 150° C.; water content: 0.8% by weight) from 40 parts by weight of lauryllactam, 11 parts by weight of dodecanedioic acid and 49 parts by weight of polyoxytetramethylenediol (M$_n$=1,000) and 70 kg of 2-(2-hydroxy-3,5-di-tert-butylphenyl)-benzotriazole (stabilizer 2) having a melting point of 154° C. are homogenized in a 20 m$^3$ tumble drier at a speed of rotation of 10 rpm in the course of 2 hours. The oxygen is then displaced by nitrogen. The drier is subsequently heated at a jacket temperature of 130° C. while passing in N$_2$ (20 m$^3$/h). When the granule temperature has reached 110° C., the entire amount of stabilizer has been absorbed by the granules. After a further 2 hours, the desired water content (<0.05% by weight) is reached. The drier contents are then cooled. A product which corresponds to the starting granules in color is obtained. HPLC analysis shows a content of 1.0 percent by weight of stabilizer 2, which corresponds to the theoretical value.

EXAMPLE 4

7 t (metric tons) of polyether-ester-amide granules (Shore D hardness: 47; viscosity number: 210; T$_m$ by DSC: 159° C.; water content: 1.0% by weight) from 50 parts by weight of lauryllactam, 9 parts by weight of dodecanedioic acid and 41 parts by weight of polyoxytetramethylenediol (M$_n$=1,000), 35 kg of pentaerythritol-tetrakis-[3-(3,5-di-tert-butyl-4-hydroxyphenyl)-propionate] (stabilizer 3) having a melting range of 110° to 125° C. and 35 kg of 2-(2-hydroxy-3,5-di-tert-butylphenyl)-benzotriazole (stabilizer 2) having a melting point of 154° C. are homogenized in a 20 m$^3$ tumble drier at a speed of rotation of 10 rpm in the course of 2 hours. The oxygen is then displaced by nitrogen. The drier is subsequently heated at a jacket temperature of 130° C. while passing in N$_2$ (20 m$^3$/h). When the granule temperature has reached 120° C., granules without pulverulent stabilizer contents are obtained (water content: 0.045% by weight and viscosity number: 208). After the contents of the drier have been cooled, a product which corresponds to the starting granules in color is obtained. HPLC analysis shows stabilizer contents which correspond to the theoretical values: 0.5 percent by weight of stabilizer 3 and 0.5 percent by weight of stabilizer 2.

EXAMPLE B (According to DE-A 21 53 249, for Comparison with Example 4)

7 kg of slightly yellowish polyether-ester-amide melt having the following analytical values are prepared in a 20 l tank with a helical stirrer starting from 50 parts by weight of lauryllactam, 9 parts by weight of dodecanedioic acid and 41 parts by weight of polyoxytetramethylenediol ($M_n$=1,000):

Viscosity number: 114

Shore D hardness: 47

Water content: 0.01% by weight 35 g of pentaerythritol-tetrakis-[3-(3,5-di-tert-butyl-4-hydroxyphenyl)-propionate] (stabilizer 3) and 35 g of 2- (2-hydroxy-3,5-di-tert-butylphenyl)-benzotriazole (stabilizer 2) are stirred into this melt, which is cooled to 250° C., at 40 rpm under a blanket of $N_2$ in the course of one hour. The melt is then discharged and granulated, only about 1 kg of melt being discharged per hour to simulate a production batch. The analytical values shown in Table 2 are determined on resulting granule samples:

TABLE 2

| Time (h) | Viscosity No. | Color | Stabilizer 3/ stabilizer 2 contents according to HPLC analysis (% by wt.)* | Decomposed stabilizer 3/ stabilizer 2 contents (% by wt.)** |
|---|---|---|---|---|
| Start 0 | 210 | yellow | 0.38/0.49 | 24/2 |
| 1 | 206 | yellow | 0.32/0.48 | 36/4 |
| 2 | 200 | yellow | 0.27/0.47 | 46/6 |
| 3 | 196 | yellow | 0.21/0.46 | 58/8 |
| 4 | 194 | yellow | 0.16/0.45 | 68/10 |
| 5 | 190 | dark yellow | 0.10/0.45 | 80/10 |
| 6 | 186 | dark yellow | 0.06/0.44 | 88/12 |

*Concentration in the granules
**Based on the starting amount of stabilizer

The table shows that the stabilizers react with the polycondensate or decompose, the viscosity number of the polycondensate decreasing. An inhomogeneous polycondensate which is not perfect in color and in which each granule particle does not have the same stabilizer content is obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the homogeneous incorporation of stabilizers into a polycondensate comprising:

i) adding a composition consisting essentially of a stabilizer to a finely divided solid polycondensate;

ii) revolving the mixture in the solid phase of said polycondensate at a temperature of at least 80° C.;

wherein revolving produces a homogeneous distribution of said stabilizer in said finely divided polycondensate.

2. The process of claim 1, wherein said temperature is at least 10° C. below the melting or softening point of said polycondensate.

3. The process of claim 1, wherein said temperature is 90° to 180° C.

4. The process of claim 1, wherein said revolving process is carried out in a tumble or paddle drier.

5. The process of claim 1, wherein said polycondensate is selected from the group consisting of polyamides, copolyamides, polyether-amides, polyether-ester-amides and polyether-esters.

6. The process of claim 5, wherein said polyamide is selected from the group consisting of polyamide 6, polyamide 66, polyamide 69, polyamide 612, polyamide 1012, polyamide 1212, polyamide 11, polyamide 12, polyamides of terephthalic acid and trimethylhexamethylenediamine and a mixture thereof.

7. The process of claim 1, wherein said stabilizer is a solid at room temperature.

8. The process of claim 1 wherein said stabilizer is selected from the group consisting of an organic antioxidant, a UV absorber and a mixture thereof.

9. The process of claim 1 wherein said stabilizer is selected from the group consisting of
2,6-di-tert-butyl-4-methylphenol,
octadecyl 3-(3,5-di-tert-butyl-4-hydroxyphenyl)propionate,
4,4'-butylidene-bis-(3-methyl-6-tert-butylphenol),
N,N'-hexamethylene-bis-(3,5-di-tert-butyl-4-hydroxyhydrocinnamide),
pentaerythritol tetrakis-[3-(3,5-di-tert-butyl-4-hydroxyphenyl)-propionate],
2,4-di-n-octylthio-6-(4-hydroxy-3,5-di-tert-butylamino)-1,3,5-triazine,
tris-(2,4-di-tert-butyl-phenyl)phosphite,
methyl β-(4-hydroxy-3,5-di-tert-butyl-phenyl)propionate,
2,2'-methylene-bis-(4-methyl-6-tert-butylphenol),
1,3,5-tris-(4-tert-butyl-3-hydroxy-2,6-dimethylbenzyl)-1,3,5-triazine-2,4,6(1H,3H,5H)trione,
4,4'-bis-(α,α-dimethylbenzyl)-diphenylamine,
N-(1,3-dimethylbutyl)-N'-phenyl-p-phenylene-diamine,
1,3,5-trimethyl-2,4,6-tris-(3,5-di-tert-butyl-4-hydroxybenzyl)-benzene,
[1,1'-biphenyl]-4,4'-diylbisphosphonous acid tetrakis[2,4-bis(1,1-dimethylethyl)phenyl]ester,
3,9-bis(octadecyloxy)-2,4,8,10-tetraoxa-3,9-diphosphaspiro[5.5]undecane,
2-(2-hydroxy-3,5-di-tert-butylphenyl)-benzotriazole,
2-(2-hydroxy-3,5-di-tert-amylphenyl)-benzotriazole,
2-(2-hydroxy-5-methylphenyl)-benzotriazole,
bis-[4-(2,2,6,6-tetramethylpiperidyl)]sebacate and a mixture thereof.

10. The process of claim 1, wherein said stabilizer is selected from the group consisting of pentaerythritol tetrakis-[3-(3,5-di-tert-butyl-4hydroxyphenyl)-propionate], N,N'-hexamethylene-bis-(3,5-di-tert-butyl-4-hydroxyhydrocinnamide), 2-(2-hydroxy-3,5-di-tert-butylphenyl)-benzotriazole, 2-(2-hydroxy-3,5-di-tert-amylphenyl)-benzotriazole and a mixture thereof.

11. The process of claim 1, wherein said stabilizer is added in an amount of less than 2% by weight based on the weight of polycondensate.

12. The process of claim 1, wherein said finely divided polycondensate has a particle size of from 0.5 to 10 mm.

13. The process of claim 1, wherein said stabilizer is a solid at room temperature and a liquid at the revolving temperature.

14. The process of claim 1, wherein said stabilizer is a solid at room temperature and a solid at the revolving temperature.

15. The process of claim 1, wherein said stabilizer has a melting point of from 100° to 200° C.

16. The process of claim 1, wherein revolving said mixture is performed until said stabilizers are diffused into said finely divided solid polycondensate.

17. The process of claim 1, wherein said polycondensate is a polyamide.

18. The process of claim 1, wherein said polycondensate is a copolyamide.

19. The process of claim 1, wherein said polycondensate is a polyether-amide.

20. The process of claim 1, wherein said polycondensate is a polyether-ester-amide.

21. The process of claim 1, wherein said polycondensate is a polyether-ester.

22. A process for the homogeneous incorporation of stabilizers into a polycondensate comprising:

i) adding a composition consisting of a stabilizer to a finely divided solid polycondensate;

ii) revolving the mixture in the solid phase of said polycondensate at a temperature of at least 80° C.;

wherein revolving produces a homogeneous distribution of said stabilizer in said finely divided polycondensate.

* * * * *